United States Patent [19]
Yoo et al.

[11] Patent Number: 5,897,219
[45] Date of Patent: Apr. 27, 1999

[54] RECORDING/PLAYBACK APPARATUS FOR DIGITAL VIDEO CASSETTE RECORDER

[75] Inventors: Byoung Koo Yoo; Choon Lee, both of Seoul, Rep. of Korea

[73] Assignee: Goldstar Co., Ltd., Seoul, Rep. of Korea

[21] Appl. No.: 08/725,268

[22] Filed: Oct. 2, 1996

Related U.S. Application Data

[63] Continuation of application No. 08/302,315, Sep. 8, 1994, abandoned.

[30] Foreign Application Priority Data

Sep. 10, 1993 [KR] Rep. of Korea ....................... 93/18269

[51] Int. Cl.⁶ .................................................... H04N 5/917
[52] U.S. Cl. ............................ 386/111; 386/123; 386/124
[58] Field of Search .................................... 358/335, 342; 360/11.1, 32, 35.1, 48; 386/27, 33, 37, 109, 111, 113, 121, 123, 124; H04N 5/92

[56] References Cited

U.S. PATENT DOCUMENTS

| | | | |
|---|---|---|---|
| 4,872,073 | 10/1989 | Fincher et al. ............................ | 360/51 |
| 4,969,055 | 11/1990 | Oberjatzas et al. ........................ | 360/32 |
| 5,138,659 | 8/1992 | Kelkar et al. .............................. | 380/20 |
| 5,175,631 | 12/1992 | Juri et al. ................................. | 358/335 |
| 5,418,658 | 5/1995 | Kwon .................................... | 360/51 X |
| 5,434,674 | 7/1995 | Masuda ................................... | 358/335 |
| 5,734,783 | 3/1998 | Shimoda et al. ..................... | 386/111 X |

FOREIGN PATENT DOCUMENTS

| | | | |
|---|---|---|---|
| 0505985 | 9/1992 | European Pat. Off. ......... | H04N 5/92 |
| 4287486 | 10/1992 | Japan ............................... | H04N 5/92 |

*Primary Examiner*—Andrew L. Sniezek

[57] ABSTRACT

A recording and playback apparatus for a digital video cassette recorder is provided with a data conversion unit for recording a compressed video signal in a more compressed format on a digital recording medium and a data inverse recording unit for playing out the recorded video signal. The data conversion unit includes a controller, encoder and multiplexer. The controller has for its inputs ID information decoded from the compressed video data signal by a decoder and a recording signal instructing the recording of the compressed video signal on a recording medium. At the start of picture recording the controller provides a selection signal to a multiplexer and a decoding instruction to an encoder to enable the encoder to recode the entire picture region of the decoded video data in an intraframe manner with a header which contains the decoding instruction information. The data inverse conversion unit includes a header decoder, a buffer controller, and a buffer. The buffer controller has as inputs the decoded instruction information output from the header decoder and a playback signal instructing the playback of compressed video data from the digital recording medium. Thus, both intraframe and interframe coded pictures can be viewed without degradation, even when playout is begun from a stopped position in the middle of a program.

8 Claims, 4 Drawing Sheets

RECORDING/PLAYBACK APPARATUS FOR DIGITAL VIDEO CASSETTE RECORDER

This application is a continuation of application Ser. No. 8/302,315 filed on Sep. 8, 1994, now abandoned.

BACKGROUND OF THE INVENTION

1. Field of the Invention

The present invention relates in general to the recording and playback of a digital video cassette recorder (VCR), and more particularly to a recording/playback apparatus for a digital VCR that prevents a degradation in a picture quality when playing back compressed video data of sequential programs edited, recorded on a single digital storage media (DSM) or when the digital VCR begins a playback operation again after being stopped.

2. Description of the Prior Art

Referring to FIG. 1, there is shown a block diagram of a conventional recording/playback apparatus for a digital VCR. As shown in this drawing, the conventional recording/playback apparatus comprises a formatter 1 for converting a format of compressed video data inputted therein into a recording format of a magnetic tape T, an error correction coder 2 for performing an error correction coding operation for output data from the formatter 1 to prevent it from being mixed with an error, a channel modulator 3 for modulating output data from the error correction coder 2 suitably to a channel characteristic of the magnetic tape T, and a recording amplifier 4 for amplifying output data from the channel modulator 3 so that it can be recorded on the magnetic tape T and output to a recording bead HD1.

The conventional recording/playback apparatus also comprises a playback amplifier 5 for amplifying by a predetermined level the compressed video data which is detected from the magnetic tape T by a playback head HD2, a channel demodulator 6 for demodulating output data from the playback amplifier 5, an error correction decoder 7 for performing an error correction decoding operation for output data from the channel demodulator 6 to correct an error mixed therewith in recording and playback processes, and a deformatter 8 for converting a format of output data from the error correction decoder 7 into the format of the original compressed video data.

The operation of the conventional recording/playback apparatus with the above-mentioned construction will hereinafter be described with reference to FIGS. 2 and 3. FIG. 2 is a view illustrating a conventional manner of compressing high definition television (HDTV) video data and FIG. 3 is a view illustrating a conventional manner of playing back the video data compressed by the conventional manner of FIG. 2 with two programs edited and recorded on the magnetic tape.

As shown in FIG. 2, the HDTV video data of one picture is compressed by an intraframe coding (dashed region) and an interframe coding (non-dashed region). For the purpose of preventing an error generated in a certain picture from having an effect on the subsequent pictures, the intraframe coding is performed cyclically on left, middle and right sides of the pictures at an interval of three pictures.

Upon inputting the HDTV video data compressed in the above manner, the formatter 1 converts the format of the inputted video data into the recording format of the magnetic tape T. The error correction coder 2 performs the error correction coding operation for the output data from the formatter 1 to prevent it from being mixed with an error. The channel modulator 3 modulates the output data from the error correction coder 2 suitably to the channel characteristic of the magnetic tape T. The recording amplifier 4 amplifies the output data from the channel modulator 3 so that it can be recorded on the magnetic tape T and outputs the amplified data to the recording head HD1. Then, the output data from the recording amplifier 4 is recorded on the magnetic tape T by the recording head HD1.

For the playback of the compressed video data recorded on the magnetic tape T in the above manner, the compressed video data is detected from the magnetic tape T by the playback head HD2 and then applied to the playback amplifier 5, which amplifies the detected video data by the predetermined level. The channel demodulator 6 demodulates the output data from the playback amplifier 5. The error correction decoder 7 performs the error correction decoding operation for the output data from the channel demodulator 6 to correct an error mixed therewith in the recording and playback processes. The deformatter 8 converts the format of the output data from the error correction decoder 7 into the original format of the compressed video data.

However, in the case where the compressed video data with a plurality of programs (for example, two programs) are edited, recorded on the magnetic tape and played back as shown in FIG. 3, an interframe coded region (non-dashed region) of a start picture (picture 3) of the program 2 is played back on the basis of a last picture (picture 2) of the program 1, resulting in degradation in a picture quality. Such a degradation may be extended at the maximum to six of the pictures of the video data compressed as shown in FIG. 2. Also, the number of degraded pictures increases in number as an intraframe coded region is made narrower.

SUMMARY OF THE INVENTION

Therefore, the present invention has been made in view of the above problem. It is an object of the present invention to provide a recording/playback apparatus for a digital VCR which is capable of preventing a degradation in quality of a start picture of a new program when playing back compressed video data with at least two programs edited and recorded on digital storage media (DSM).

In accordance with the present invention, the above and other objects can be accomplished by a provision of recording/playback apparatus for a digital video cassette recorder comprising data conversion means for decoding compressed video data inputted therein and recoding the entire picture region of the decoded video data in an intraframe manner to compress it; error correction coding means for performing an error correction coding operation for output data from said data conversion means to prevent it from being mixed with an error; channel modulation means for modulating output data from said error correction coding means suitably to a channel characteristic of a digital storage medium; said digital storage medium recording output data from said channel modulation means; channel demodulation means for demodulating the compressed video data detected from said digital storage medium; error correction decoding means for performing an error correction decoding operation for output data from said channel demodulation means to correct an error mixed therewith in recording and playback processes; and data inverse conversion means for inverse-converting a format of output data from said error correction decoding means back into an original format.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
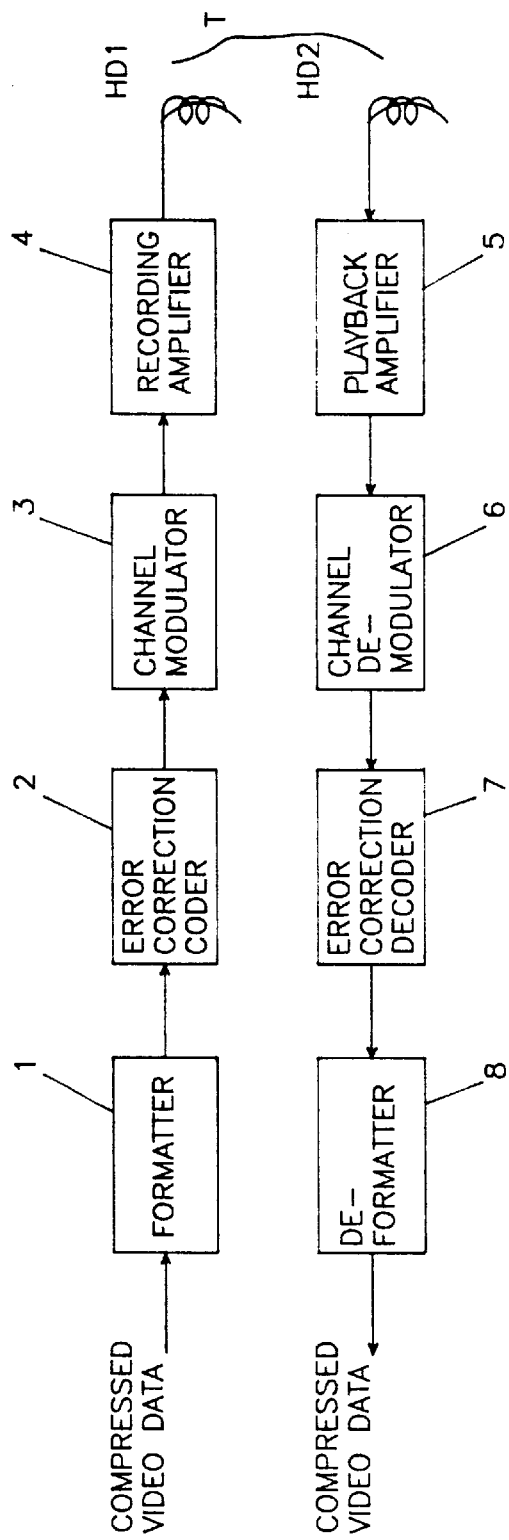
FIG. 1 is a block diagram of a conventional recording/playback apparatus for a digital VCR.
Figure 2:
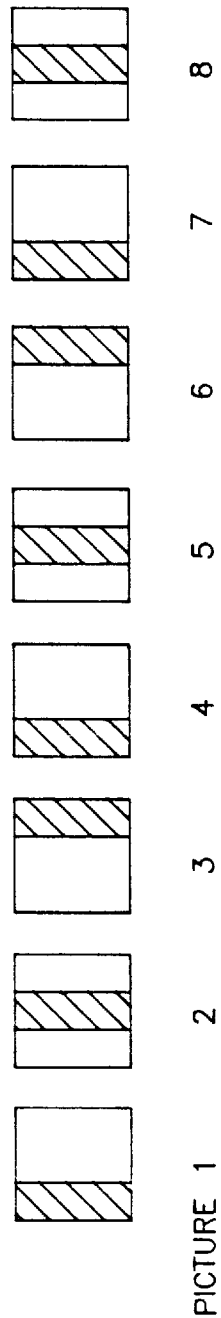
FIG. 2 is a view illustrating a conventional manner of compressing HDTV video data.
Figure 3:
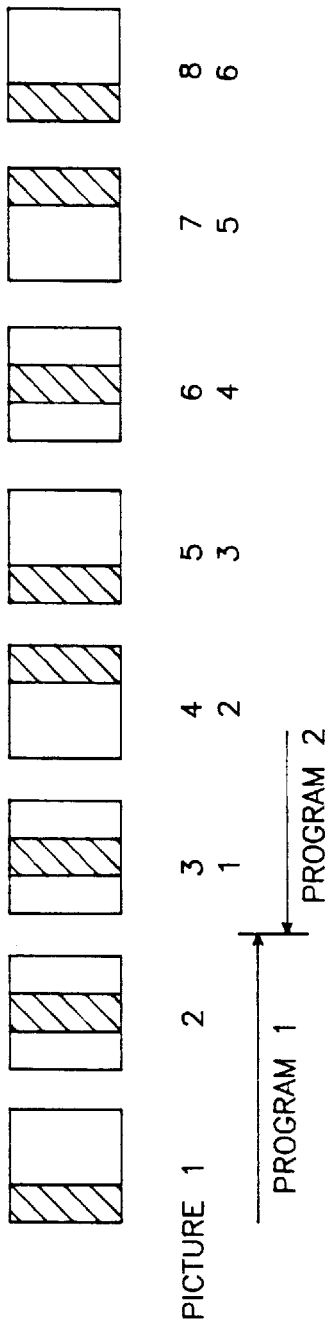
FIG. 3 is a view illustrating a conventional manner of playing back the video data compressed by the conventional manner of FIG. 2 with two programs edited and recorded on a magnetic tape.
Figure 4:
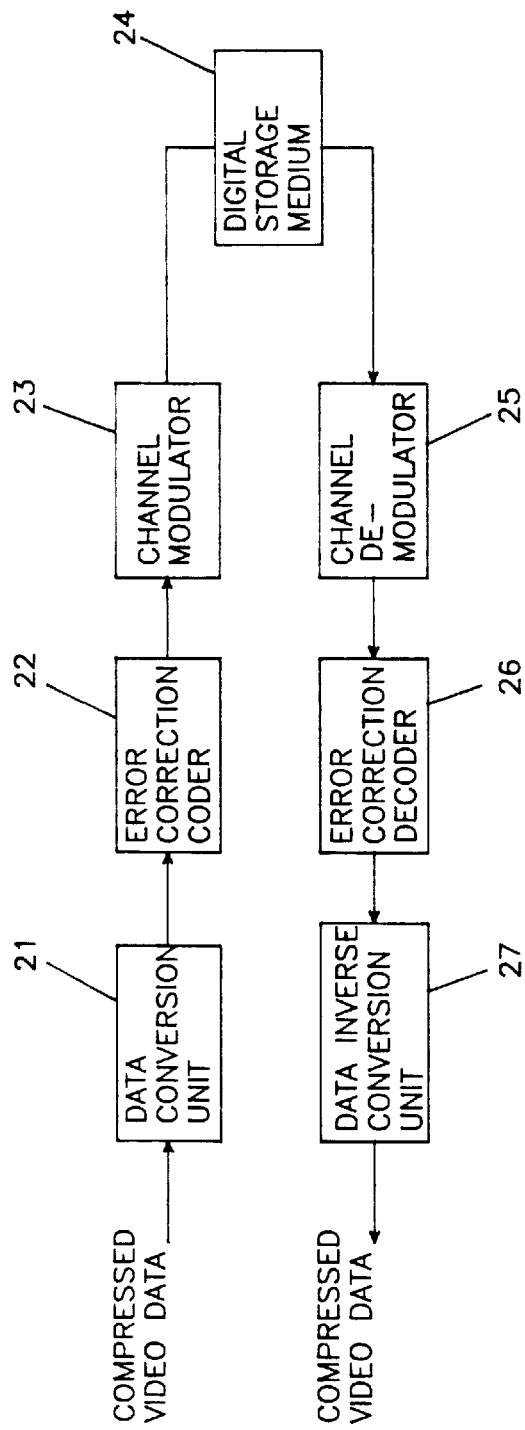
FIG. 4 is a block diagram of a recording/playback apparatus for a digital VCR in accordance with the present invention.

Referring to FIG. 4, there is shown a block diagram of a recording/playback apparatus for a digital VCR in accordance with the present invention. As shown in this drawing, the recording/playback apparatus comprises a data conversion unit 21 for decoding compressed video data inputted therein and recoding the entire picture region of the decoded video data in an intraframe manner to compress it, an error correction coder 22 for performing an error correction coding operation for output data from the data conversion unit 21 to prevent it from being mixed with an error, and a channel modulator 23 for modulating output data from the error correction coder 22 suitably to a channel characteristic of a digital storage medium 24. The digital storage medium 24 is adapted to record output data from the channel modulator 23.

The recording playback apparatus also comprises a channel demodulator 25 for demodulating the compressed video data detected from the digital storage medium 24, an error correction decoder 26 for performing an error correction decoding operation for output data from the channel demodulator 25 to correct an error mixed therewith in recording and playback processes, and a data inverse conversion unit 27 for inverse-converting a format of output data from the error correction decoder 26 into an original one.

Figure 6:
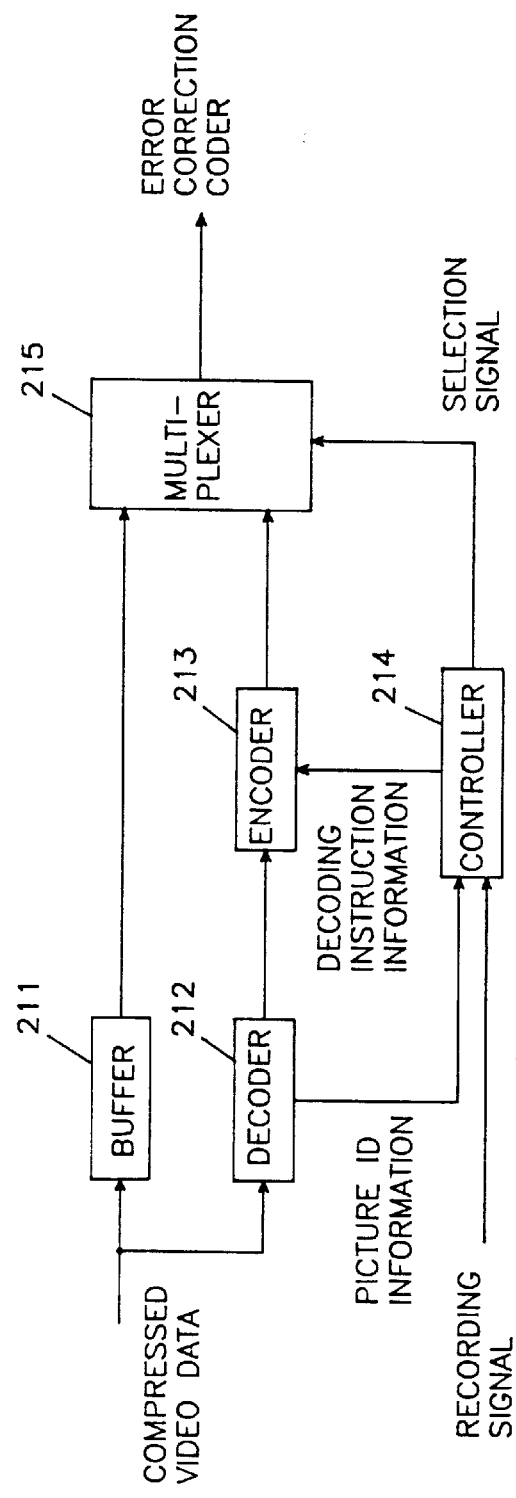
FIG. 6 is a detailed block diagram of a data conversion unit in FIG. 4.

Referring to FIG. 6, there is shown a detailed block diagram of the data conversion unit 21 in FIG. 4. As shown in this drawing, the data conversion unit 21 includes a decoder 212 for decoding the inputted compressed video data and detecting picture identification (ID) information from the inputted compressed video data. The picture identification information represents a picture order.

The data conversion unit 21 also includes a controller 214 for generating decoding instruction information and selection signal in response to the picture identification information from the decoder 212 and a recording signal instructing the recording of the compressed video data on the digital storage medium 24, an encoder 213 for recoding the entire picture region of the decoded video data from the decoder 212 in the intraframe manner to compress it and inserting the decoding instruction information from the controller 214 into a header of the recoded video data, a buffer 211 for temporarily delaying the inputted compressed video data to match its timing with that of output data from the encoder 213, and a multiplexer 215 for selectively applying output data from the buffer 211 and the output data from the encoder 213 to the error correction coder 22 in response to the selection signal from the controller 214.

Figure 7:
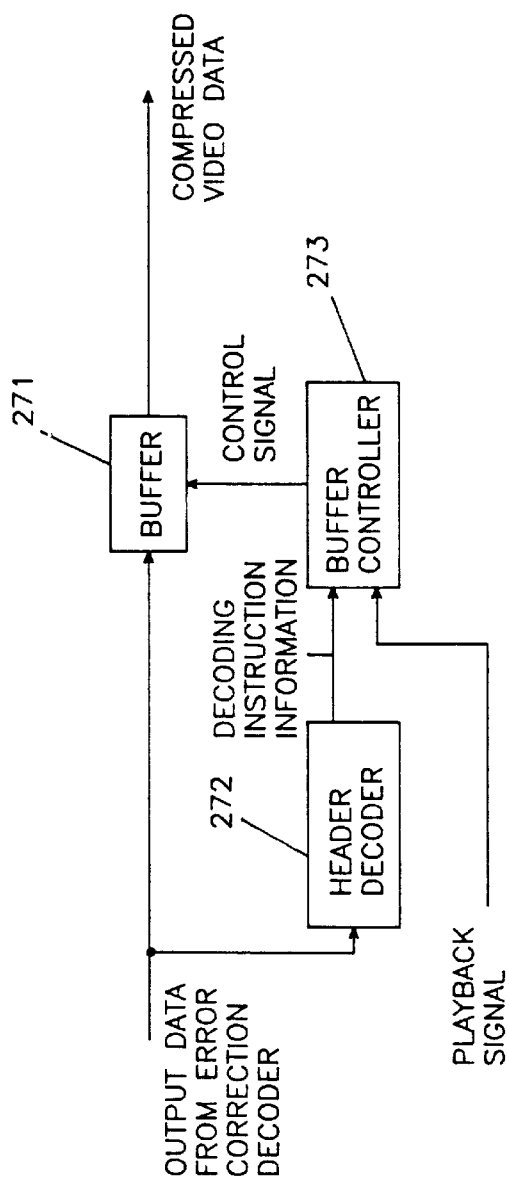
FIG. 7 is a detailed block diagram of a data inverse conversion unit in FIG. 4.

Referring to FIG. 7, there is shown a detailed block diagram of the data inverse conversion unit 27 in FIG. 4. As shown in this drawing, the data inverse conversion unit 27 includes a buffer 271 for temporarily storing the output data from the error correction decoder 26, a header decoder 272 for detecting the decoding instruction information from the header of the recoded video data of the output data from the error correction decoder 26, and a buffer controller 273 for outputting a control signal to the buffer 271 in response to the decoding instruction information from the header decoder 272 and a playback signal instructing the playback of the compressed video data from the digital storage medium 24, to control the buffer 271 to selectively output the stored data.

The operation of the recording/playback apparatus with the above-mentioned construction in accordance with the present invention will hereinafter be described in detail.

Figure 5:
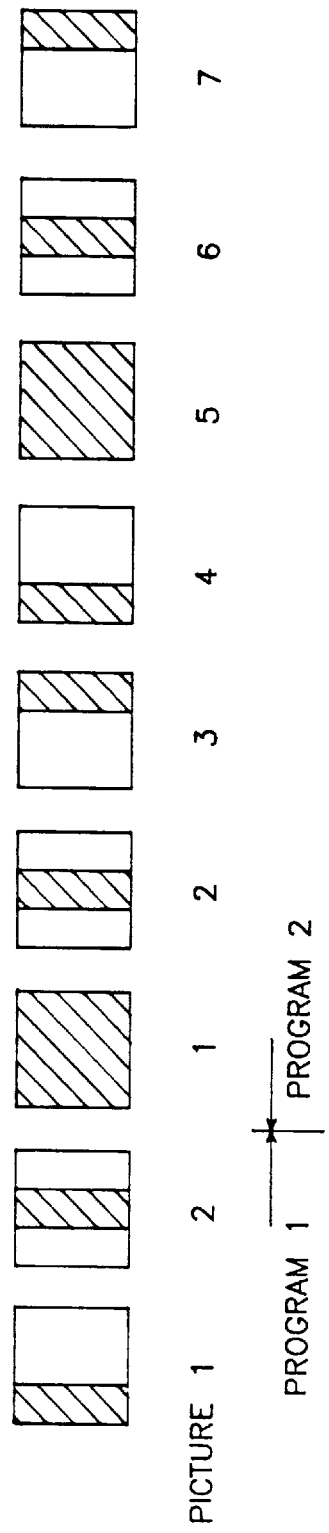
FIG. 5 is a view illustrating a manner of recording compressed video data with two programs edited, in accordance with the present invention.

Upon inputting the compressed video data, the data conversion unit 21 decodes the inputted compressed video data and recodes the entire picture region of the decoded video data in the intraframe manner to compress it. The recoded compressed video data is arranged as shown in FIG. 5. In this case, the recoded compressed video data has the same syntax as that before the decoding.

The operation of the data conversion unit 21 will hereinafter be described in more detail with reference to FIG. 6.

First, the inputted compressed video data is delayed by the buffer 211 and then applied to the multiplexer 215. The inputted compressed video data is also decoded by the decoder 212 and then applied to the encoder 213. The decoder 212 detects the picture identification information from the inputted compressed video data and outputs the detected picture identification information to the controller 214. The picture identification information represents the picture order. The controller 214 generates the decoding instruction information and the selection signal in response to the picture identification information from the decoder 212 and the recording signal instructing the recording of the compressed video data on the digital storage medium 24. The decoding instruction information and the selection signal from the controller 214 are applied to the encoder 213 and the multiplexer 215, respectively.

The encoder 213 recodes the entire picture region of the decoded video data from the decoder 212 in the intraframe manner to compress it and inserts the decoding instruction information from the controller 214 into the header of the recoded video data. The resultant compressed video data from the encoder 213 is applied to the multiplexer 215. Here, the decoding instruction information is turned on when the recording signal is initially made active, so that the recoded video data can necessarily be decoded in the playback process. The decoding instruction information is then turned off so that the subsequent video data cannot be decoded.

The multiplexer 215 selectively applies the output data from the buffer 211 and the output data from the encoder 213 to the error correction coder 22 in response to the selection signal from the controller 214. The selection signal from the controller 214 allows the multiplexer 215 to select the output data from the buffer 211 and the output data from the encoder 213 so that the compressed video data recorded on the digital storage medium 24 can be arranged in the form as shown in FIG. 5. While selecting basically the output data from the buffer 211, the multiplexer 215 selects the output data from the encoder 213 when the recording signal is initially made active and then selects it periodically.

In the case where two edited programs are successively recorded on the digital storage medium 24 as shown in FIG. 5, initial compressed video data of the program 2 is the compressed video data recoded in the intraframe manner by the encoder 213, which can necessarily be decoded in the playback process according to the decoding instruction information inserted into the header thereof. Then, the compressed video data from the buffer 211 follows the recoded compressed video data from the encoder 213. Thereafter, the recoded compressed video data from the encoder 213 is periodically appended with the decoding instruction information inserted into the header thereof to instruct no decoding in the playback process. But, when the digital VCR is changed from a stop mode to a playback mode, an initial one of the periodically appended, recoded compressed video data is selected.

Then, the error correction coder 22 performs the error correction coding operation for the output data from the data conversion unit 21 to prevent it from being mixed with an error. The channel modulator 23 modulates the output data from the error correction coder 22 suitably to the channel characteristic of the digital storage medium 24. The output data from the channel modulator 23 is recorded on the digital storage medium 24.

For the playback of the compressed video data recorded on the digital storage medium 24 in the above manner, the compressed video data is detected from the digital storage medium 24 and then applied to the channel demodulator 25, which demodulates the detected compressed video data. The error correction decoder 26 performs the error correction decoding operation for the output data from the channel demodulator 25 to correct an error mixed therewith in the recording and playback processes. Then, the data inverse conversion unit 27 inverse-converts the format of the output data from the error correction decoder 26 into the original format, as will hereinafter be described in more detail with reference to FIG. 7.

In FIG. 7, the output data from the error correction decoder 26 is applied to the buffer 271 and the header decoder 272. The buffer 271 stores temporarily the output data from the error correction decoder 26. The header decoder 272 detects the decoding instruction information from the header of the recoded video data of the output data from the error correction decoder 26 and outputs the detected decoding instruction information to the buffer controller 273. In response to the decoding instruction information from the header decoder 272 and the playback signal instructing the playback of the compressed video data from the digital storage medium 24, the buffer controller 273 outputs the control signal to the buffer 271.

Figure 8:
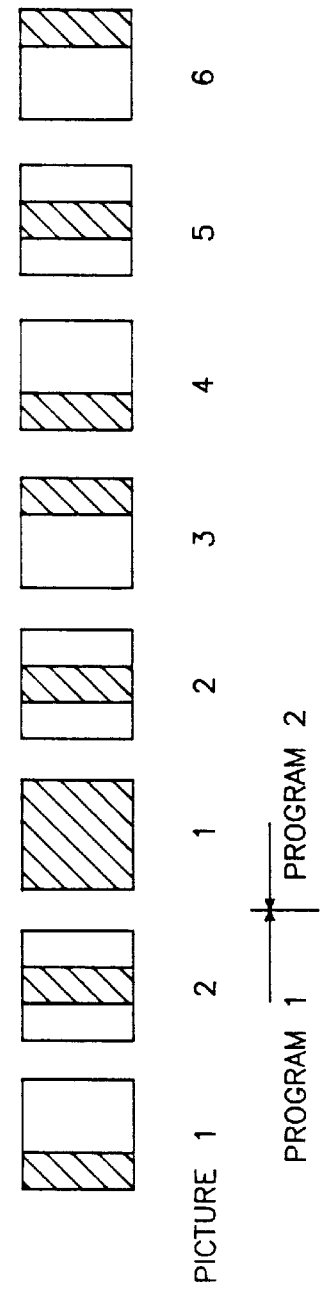
FIG. 8 is a view illustrating a manner of playing back the compressed video data recorded by the manner of FIG. 5 in accordance with the present invention.

In response to the control signal from the buffer controller 273, the buffer 271 outputs selectively the stored data as shown in FIG. 8. Basically, the buffer 271 discards the compressed video data recoded in the intraframe manner in the data conversion unit 21. But, the buffer 271 outputs the recoded video data with the decoding instruction information turned on, corresponding to a start picture of a new program and the recoded video data inputted when the playback signal is initially made active.

As apparent from the above description, according to the present invention the recording/playback apparatus for the digital VCR can prevent degradation in picture quality when playing back the compressed video data have at least two programs edited and recorded on the digital storage medium, or when the digital VCR performs a playback operation again after being stopped.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data conversion unit for a digital video recording/playback apparatus, comprising:

decoder means for receiving inputted compressed video data having a plurality of frames, a portion of a picture region of each frame being compressed by a cyclical intraframe encoding at a periodic interval of a predetermined number of frames and a remaining portion of the picture region of each frame being compressed by an interframe encoding, said decoder means detecting picture identification information contained in the inputted compressed video data and decoding the inputted compressed video data in accordance with the detected picture identification information;

encoder means for receiving the decoded video data from said decoder means and for re-encoding an entire picture region of the decoded video data by an intraframe coding compression, and for inserting a decoding instruction information into a header of the re-encoded compressed video data;

buffer means for temporarily delaying the inputted compressed video data by a processing time of said decoder means and said encoder means;

controller means for receiving a recording signal instructing a recording operation and also the picture identification information detected by said decoder means, and for generating the decoding instruction information and a selection signal in response to the recording signal and the picture identification information; and multiplexer means for receiving the delayed inputted compressed video data from said buffer means and the re-encoded compressed video data from said encoder means, and for selectively outputting the delayed inputted compressed video data from said buffer means and the re-encoded compressed video data from said encoder means in response to the selection signal generated by said controller means.

2. The data conversion unit according to claim 1, wherein, when the recording signal received by said controller means is initially made active upon commencement of a video program recording, said controller means generates the selection signal so as to cause said multiplexer means to initially select the re-encoded compressed video data from said encoder means for outputting and to thereafter periodically select the re-encoded compressed video data from said encoder for outputting.

3. The data conversion unit according to claim 1, wherein said controller means turns on the decoding instruction information when the recording signal received by said controller means is initially made active upon commencement of a video program recording and subsequently turns off the decoding instruction information.

4. A data inverse-conversion unit for a digital video recording/reproducing apparatus, comprising:

header decoder means for receiving inputted compressed video data having a plurality of frames, a portion of a picture region of each frame being compressed by a cyclical intraframe encoding at a periodic interval of a predetermined number of frames and a remaining portion of the picture region of each frame being compressed by an interframe encoding, a start picture frame of a new program in the inputted compressed video data and periodically occurring frames thereafter containing an entire picture region compressed by an intraframe encoding and also containing a header with a decoding instruction information, said header decoder means detecting the decoding instruction information contained in the header of the intraframe-encoded video data, which decoding instruction information has a turned on state for the start picture frame of a new program, and a turned off state for subsequent intraframe encoded frames of the new program;

buffer means for storing the inputted compressed video data and for selectively outputting the stored compressed video data in response to a control signal; and buffer controller means for receiving a playback signal instructing a playback operation and the detected decoding instruction information from said header decoder means, and for generating and outputting the control signal to said buffer means in response to the playback signal and the detected decoding instruction information, so as to cause said buffer means to selectively output the intraframe-encoded video data only when the detected decoding instruction information has the turned on state and when the playback signal is initially made active.

5. A data conversion unit for a digital video recording/playback apparatus, comprising:

a decoder receiving inputted compressed video data having a plurality of frames, a portion of a picture region of each frame being compressed by a cyclical intraframe encoding at a periodic interval of a predetermined number of frames and a remaining portion of the picture region of each frame being compressed by an interframe encoding, said decoder also detecting picture identification information contained in the inputted compressed video data and decoding the inputted compressed video data in accordance with the detected picture identification information;

an encoder receiving the decoded video data from said decoder and re-encoding an entire picture region of the decoded video data by an intraframe coding compression, and inserting a decoding instruction information into a header of the re-encoded compressed video data;

a buffer temporarily delaying the inputted compressed video data by a processing time of said decoder and said encoder;

a controller receiving a recording signal instructing a recording operation and also the picture identification information detected by said decoder, and generating the decoding instruction information and a selection signal in response to the recording signal and the picture identification information; and a multiplexer receiving the delayed inputted compressed video data from said buffer and the re-encoded compressed video data from said encoder, said multiplexer selectively outputting the delayed inputted compressed video data from said buffer and the re-encoded compressed video data from said encoder in response to the selection signal generated by said controller.

6. The data conversion unit according to claim 5, wherein, when the recording signal received by said controller is initially made active upon commencement of a video program recording, said controller generates the selection signal so as to cause said multiplexer to initially select the re-encoded compressed video data from said encoder for outputting and to thereafter periodically select the re-encoded compressed video data from said encoder for outputting.

7. The data conversion unit according to claim 5, wherein said controller turns on the decoding instruction information when the recording signal received by said controller is initially made active upon commencement of a video program recording, and subsequently turns off the decoding instruction information.

8. A data inverse-conversion unit for a digital video recording/reproducing apparatus, comprising:

a header decoder receiving inputted compressed video data having a plurality of frames, a portion of a picture region of each frame being compressed by a cyclical intraframe encoding at a periodic interval of a predetermined number of frames and a remaining portion of the picture region of each frame being compressed by an interframe encoding, a start picture frame of a new program in the inputted compressed video data and periodically occurring frames thereafter containing an entire picture region compressed by an intraframe encoding and also containing a header with a decoding instruction information, said header decoder detecting the decoding instruction information contained in the header of the intraframe-encoded video data, which decoding instruction information has a turned on state for the start picture frame of a new program, and a turned off state for subsequent intraframe encoded frames of the new program;

a buffer storing the inputted compressed video data and selectively outputting the stored compressed video data in response to a control signal; and a buffer controller receiving a playback signal instructing a playback operation and the detected decoding instruction information from said header decoder, and generating and outputting the control signal to said buffer in response to the playback signal and the detected decoding instruction information, so as to cause said buffer to selectively output the intraframe-encoded video data only when the detected decoding instruction information has the turned on state and when the playback signal is initially made active.

* * * * *